F. W. HARRIS.
ELECTRIC THERMOSTAT.
APPLICATION FILED MAY 6, 1907.
963,763.
Patented July 12, 1910.
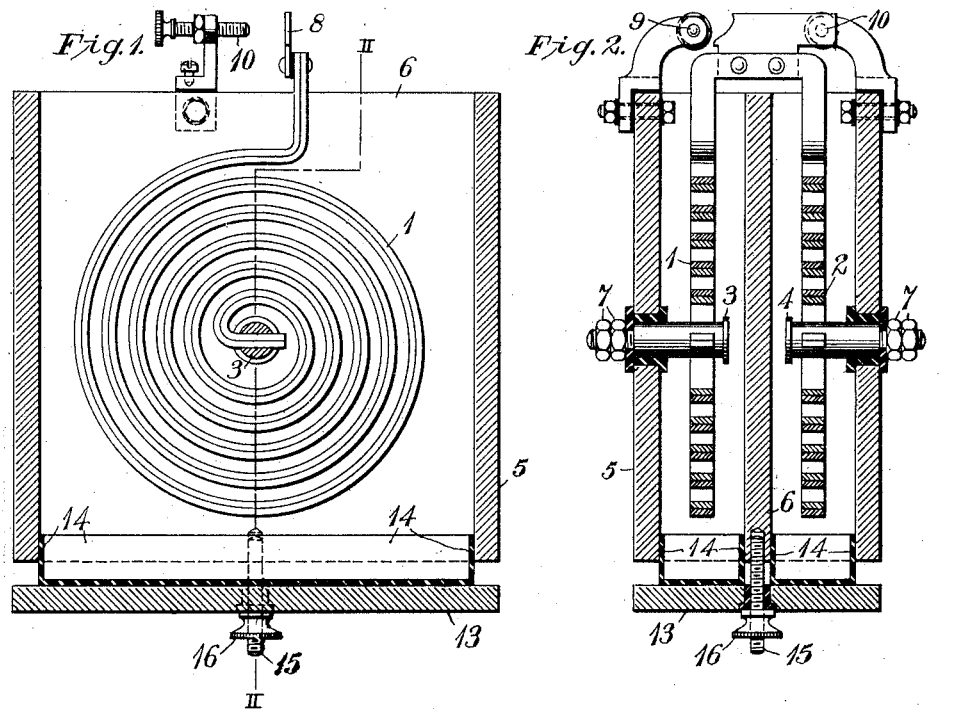
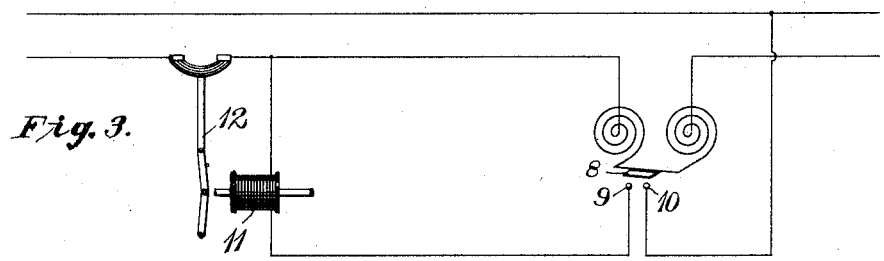
WITNESSES:
Fred H Miller
R. J. Dearborn
INVENTOR
Ford W. Harris
BY
Wesley G. Carr
ATTORNEY

UNITED STATES PATENT OFFICE.

FORD W. HARRIS, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRIC THERMOSTAT.

963,763.

Specification of Letters Patent. Patented July 12, 1910.

Application filed May 6, 1907. Serial No. 372,207.

*To all whom it may concern:*

Be it known that I, FORD W. HARRIS, a citizen of the United States, and a resident of Wilkinsburg, in the county of Allegheny and State of Pennsylvania, have invented a new and useful Improvement in Electric Thermostats, of which the following is a specification.

My invention relates to thermostats or to devices which are adapted to automatically produce a mechanical movement when subjected to temperature variations, and it has for its object to provide a simple and durable device of the said class for producing a predetermined mechanical movement that shall be dependent in character and extent upon the temperature existing in the device by reason of the passage of an electric current therethrough and also upon the magnetic effect produced by such current.

In another application, of even date herewith, entitled Improvement in protective devices for electric apparatus, Serial No. 372,206, I have described a thermo-responsive device employed in connection with a circuit interrupter for the purpose of protecting electrical translating devices, the mechanical movement produced by the thermostat being utilized for closing an auxiliary control circuit. When thermo-responsive devices are used in this and similar connections, it is desirable to provide means whereby a part of the motion is directly dependent upon the electric current passing through the thermo-responsive element in order that the auxiliary circuit may be interrupted as soon as the main supply circuit is broken. Furthermore, the arrangement of parts is such that the device which is normally responsive to thermal variations and also to fluctuations in the electric current flowing through it, may be promptly actuated, merely by the flow of an electric current considerably in excess of the normal working currents. Consequently, the effect of either a temperature rise or an electrical overload, as well as the combined effect of both of these conditions, will serve to actuate a circuit interrupter or other protective device.

According to my present invention, I provide a thermo-responsive element in the form of a double spiral of conducting material through which an electric circuit may be established, and I further provide a magnetizable box or casing which is adapted to produce a magnetic field across the conducting spirals when an electric current is passed through them.

Figure 1 of the accompanying drawings is a view, partially in section but mainly in elevation, of a thermostat constructed in accordance with my invention, and Fig. 2 is a sectional view on the line II—II of Fig. 1. Fig. 3 is a diagrammatic view of the circuit connections of a system of distribution embodying my invention.

The device shown in the drawings comprises two similar resilient spirals 1 and 2, the outer ends of which are joined together and the inner ends of which are secured, respectively, to studs or terminal posts 3 and 4. Each of the spirals is composed of two conducting strips having different co-efficients of expansion, such, for example, as copper and German silver, the outer ends of which are riveted or otherwise secured together.

The terminal posts 3 and 4 are supported in the side walls of a box 5 of magnetizable material which is provided with a partition 6 of magnetizable material that projects between the spirals 1 and 2. The outer ends of the terminals 3 and 4 are provided with set nuts 7 so that they may be readily connected, by flexible conductors or other suitable means, to an electric supply circuit. When electric current traverses both of the spirals in series, a magnetic field is established through the walls and the partition of the magnetizable box 5 and across the turns of the spirals. This magnetic field tends to produce a movement of the outer ends of the spirals in the same direction as that produced by the heat expansion of the conductors of which they are formed. A contact member 8 is attached to and is insulated from the junction of the two spirals, and two relatively stationary adjustable contact members 9 and 10 are adapted to be engaged thereby when a predetermined movement of the outer ends of the spirals is effected.

When the combined effects of heat and magnetism are sufficient to bring the movable contact member 8 into engagement with the stationary contact members, an auxiliary circuit is established through a tripping magnet 11 of a circuit interrupter 12. As soon as the main circuit is interrupted, the auxiliary circuit will be broken, since the magnetic effect of the current traversing the spirals disappears immediately. In the same way, if a sufficiently large current traverses the spiral, the electro-magnetic effect will serve to interrupt the circuit, the turns of the spiral acting as a magnet winding.

The casing 5, in which the spirals are located, may be filled with oil or other insulating fluid when it is desirable to introduce a greater time element to retard the thermostatic action of the device. An adjustment of the reluctance of the magnetic circuit may be effected, if desired, since the bottom or end wall 13 of the box 5 is provided with guide strips 14 and is adjustably attached to the partition 6 by a screw-threaded pin 15 and a set nut 16. In this way, an adjustable air gap may be introduced in the magnetic circuit, which is completed through the walls of the box, as hereinbefore explained, and the value of an electric current at which the electro-magnetic action will trip the circuit-breaker can be predetermined.

The thermostat of my present invention is not restricted in its use to the circuit relations shown in the drawings, and I desire that only such limitations shall be imposed as are indicated in the appended claims.

I claim as my invention:

1. A thermostat comprising a centrally-supported spiral of resilient conducting materials which is movably responsive to the combined actions of the heat and the magnetic flux produced by currents flowing through it, and a magnetizable frame constituting both a support and a partial circuit for the magnetic flux produced by the currents which traverse said spiral.

2. A thermostat comprising a spiral of conducting materials which is movably responsive to the combined actions of the heat and the magnetic flux produced by an electric current flowing through it, and a magnetizable frame to support said spiral and serve as a partial circuit for the magnetic flux produced by the currents which traverse said spiral.

3. A thermostat comprising a magnetizable box or frame, a pair of similar conducting spirals supported by and insulated from the walls of the box or frame at their central points and electrically connected together at their outer ends, and movably responsive to the combined actions of the heat and the magnetic flux produced by currents flowing through them.

4. A thermostat comprising a magnetizable box or frame, a pair of similar conducting spirals supported by and insulated from the walls of the box or frame at their central points and connected together at their outer ends and movably responsive to the actions of the heat and the magnetic flux produced by currents flowing through them, and a magnetizable middle partition which separates the two spirals.

5. A thermostat comprising a magnetizable box or frame, a middle partition disposed substantially parallel to the side walls of the box or frame to form two chambers, terminal posts supported by and insulated from the side walls and projecting into the chambers, and resilient conducting spirals attached to and supported by the terminal posts and connected together at their outer ends.

6. A thermostat comprising an expansible electric current-conducting member that is movably responsive to the combined actions of the heat and the magnetic flux produced by currents flowing through it, a movable member actuated thereby, and a magnetizable casing which influences the action of the movable member and is magnetized solely by said current-conducting member.

7. A thermostat comprising centrally-supported spirals of conducting material, magnetizable plates between and at the outer sides of the spirals and an adjustable cross strip or armature of magnetizable material disposed in a plane substantially perpendicular to the planes of the plates.

8. A thermostat comprising similar spirals of conducting material centrally-supported in parallel planes, magnetizable plates between and at the outer sides of the spirals, the outer ends of the spirals being joined together and their inner ends being insulated from their supports, and a cross strip or armature of magnetizable material disposed in a plane substantially perpendicular to the planes of the spirals.

9. A thermostat comprising a magnetizable box or frame having side walls, a middle partition substantially parallel to the side walls to form two chambers, terminal posts supported by and insulated from the side walls and projecting into the chambers, resilient conducting spirals attached to and centrally-supported by the terminal posts and joined together at their outer ends, and an adjustably supported plate or end wall that is perpendicular to the side walls.

10. A thermostat comprising a centrally-supported spiral consisting of two resilient strips of conducting materials having unlike co-efficients of expansion and fastened together to form a double strip traversed by currents and movably responsive to the combined actions of the heat and the magnetic flux produced by said currents, a magnetizable frame serving as a support for said spiral and as a path for the magnetic flux generated by currents flowing through it, a contact member attached to the outer end of the spiral and insulated therefrom, and coöperating stationary contact members.

11. A thermostat comprising two centrally supported spirals each consisting of two resilient strips of conducting materials having unlike co-efficients of expansion and fastened together to form a double strip, a magnetizable frame disposed between and at the sides of said spirals, a contact member attached to and insulated from the outer ends of said spirals and coöperating stationary contact members.

12. A thermostat comprising two centrally-supported spirals each consisting of two resilient strips of conducting materials having unlike co-efficients of expansion and fastened together to form a double strip, a magnetizable frame disposed between and at the sides of said spirals, a contact member attached to the outer ends of said spirals and insulated therefrom, and adjustable stationary contact members which coöperate therewith.

13. A heat-responsive device comprising a magnetizable box or frame having side walls, an intermediate partition and an end plate forming two chambers, electrical terminal posts supported by and insulated from the side walls and projecting into the chambers, two similar spirals attached to and supported by the terminal posts, said spirals consisting of resilient strips each formed of two conducting ribbons of unlike co-efficients of expansion and fastened together, and means for adjusting the end plate to introduce an air gap in the magnetic circuit formed by the side walls and intermediate partition.

14. A heat-responsive device comprising a magnetizable box or frame having side walls, an intermediate partition and an end plate therefor forming two chambers, electrical terminal posts supported by and insulated from the side walls and projecting into the chambers, two similar spirals attached to and supported by the terminal posts and joined together at their outer extremities, said spirals consisting of resilient strips each formed of two conducting ribbons of unlike co-efficients of expansion and fastened together, means for adjusting the end plate to introduce an air gap into the magnetic circuit formed by the side walls and the intermediate partition, a contact member attached to and insulated from the junction of the two spirals, and coöperating stationary contact members.

15. A heat-responsive device comprising a magnetizable box or frame having side walls, an intermediate partition and an end plate forming two chambers, electrical terminal posts supported by and insulated from the side walls and projecting into the chambers, two similar spirals attached to and supported by the terminal posts and joined together at their outer extremities, said spirals consisting of resilient strips each formed of two conducting ribbons of unlike co-efficients of expansion and fastened together, means for adjusting the end plate to introduce an air gap into the magnetic circuit formed by the side walls and the intermediate partition, a contact member attached to and insulated from the junction of the two spirals, and adjustable stationary contact members which coöperate therewith.

In testimony whereof, I have hereunto subscribed my name this 30th day of April, 1907.

FORD W. HARRIS.

Witnesses:
J. A. Dow,
BIRNEY HINES.